A. H. WAGNER.
Grain Drill.
No. 48,117.                                              Patented June 6, 1865.
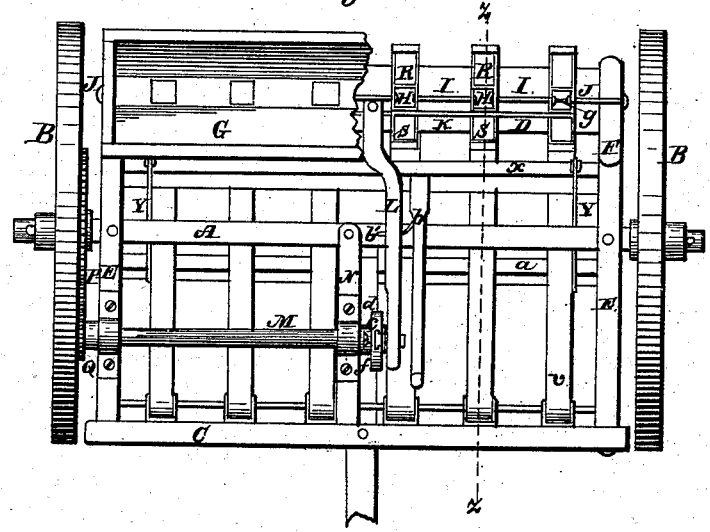
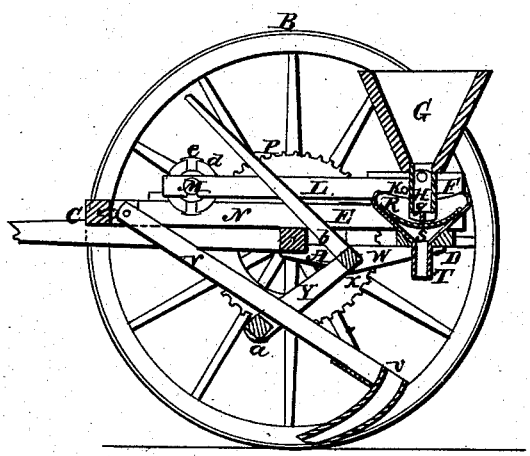
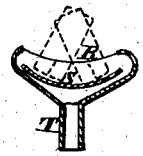
Witnesses.
Inventor.

UNITED STATES PATENT OFFICE.

A. H. WAGNER, OF CHICAGO, ILLINOIS.

IMPROVEMENT IN SEED-DRILLS.

Specification forming part of Letters Patent No. 48,117, dated June 6, 1865.

*To all whom it may concern:*

Be it known that I, AUSBENT H. WAGNER, of Chicago, Cook county, and State of Illinois, have invented certain new and useful Improvements in Seed-Drills; and I do hereby declare that the following description and accompanying drawings are sufficient to enable any person skilled in the art or science to which it most nearly appertains to make and use my said invention or improvements without further invention or experiment.

The nature of my invention and improvements consists in the peculiar construction of devices, hereinafter described and claimed, which enable the machine to plant the seed without breaking the kernels, and also to plant a given quantity of seed to the acre.

In the accompanying drawings the same letters indicate like parts in each of the figures.

Figure 1 is a plan or top view of a seed-drill with my improvements. Fig. 2 is a section through the line Z Z of Fig. 1.

In these drawings, A is the axle; B B, the wheels, and C the front bar; D, the rear bar, which, with the side bars, E E, form the frame or carriage of the machine. There are some blocks fastened on the top of the rear ends of the side bars, one of which is shown at F, to which blocks the seed-box G is fastened. The seed-box is made in the form shown in the drawings, and its bottom is perforated to let the seed into the vibrating tubes H H. These tubes are connected by the short rods I I, and the rods J J project from the two outside tubes into the blocks F to form journals for the tubes to vibrate on. The rod K is fastened to the front of the tubes H, about midway between the top and bottom, and to this rod K the link L is applied, to vibrate the tubes by connecting them to the crank on the end of the shaft M, which turns in boxes on the bar N and side bar, E, and is rotated by the gear P on the wheel B acting on the pinion Q on the shaft M. The rear bar, D, is perforated to form seats for the seed-cups R R. (Shown enlarged in Fig. 3.) These seed cups are provided with a curved inner bottom, S, on which the seed falls and remains until it is pushed off of the ends by the vibration of the tube, when it (the seed) slides down the inclined bottom of the cup and through the tube T into the drilling-tubes U, which are made in the form shown in the drawings, and fastened to the bars V, which are hung in brackets fastened to the front bar, C, so as to vibrate to raise and lower the tubes.

There are two bars fastened to the under side of the axle and the rear bar, one of which is shown at W, to support the rock-shaft X, which is fitted to turn in them, and provided with arms Y Y, which carry the bar $a$ under the bars V V, and the end of the lever $b$ is fastened in the rock-shaft to work it and raise the drilling-teeth from the ground when passing around the ends or at the corners of the field. The lever $b$ has a hook, $b'$, on its side to raise the link L at the same time the tubes are raised and stop the vibration of the tubes and the delivery of the seed.

The front and rear sides of the tubes H are made shorter than the other two sides, and there is a perpendicular partition, $g$, across the lower end of the tube between the two longest sides, which partition, as the tube is vibrated, pushes the seed in the seed-cups off of the ends of the inner bottoms of the cups, so that it descends to the drilling-tubes, which plant it in the ground.

The crank on the shaft M consists of a disk, $d$, with a dovetailing groove across its face, to which the slide $e$ is fitted to traverse, and is fastened in the position required by the screw $f$, which is screwed through the disk against it. The wrist-pin of the crank is fastened to the slide $e$, so as to traverse with it and adjust the length of stroke and amount of vibration of the tubes to regulate the quantity of seed and graduate it to the area of ground planted.

The seed-box may be connected to the vibrating tubes and the seed-cups to the drilling-tubes by flexible tubes of leather or cloth.

I claim—

1. The vibrating feeding-tubes H, provided with a partition across the lower end to stir the grain and feed the drilling-tubes.

2. In combination with the vibrating feeding-tubes H, the receiving-cups R, with curved inner bottoms to hold the seed until it is pushed off by the vibrating tubes, substantially as described.

3. The hook on the lever, which raises the link from the wrist-pin simultaneously with the raising of the drilling-teeth.

A. H. WAGNER.

Witnesses:
CONRAD L. DIEHL,
H. J. EDWARDS.